July 17, 1928.
P. CANTIN
CULTIVATOR
Filed March 11, 1927
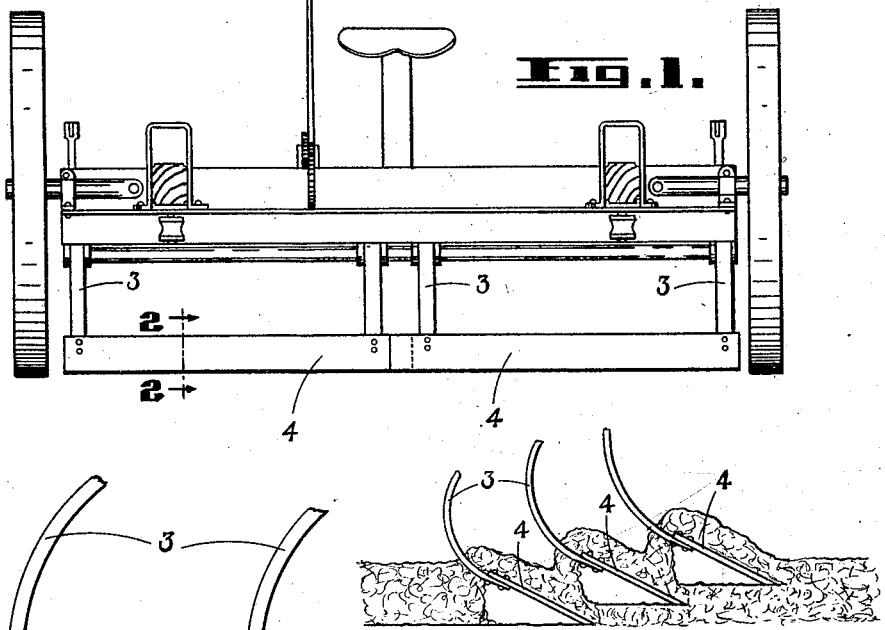
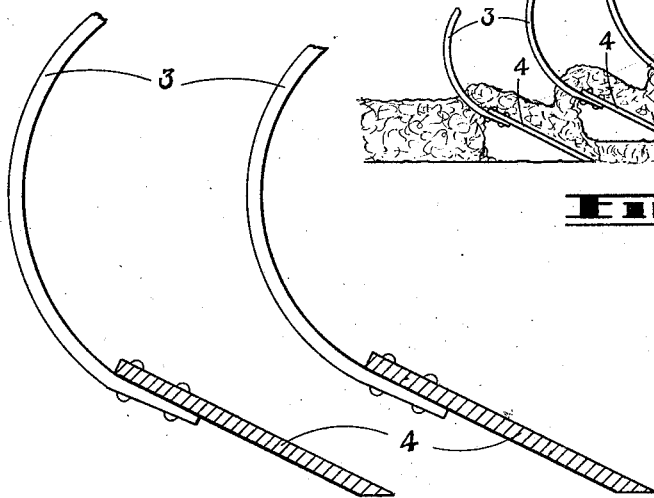
Paul Cantin,
INVENTOR.
BY Harold C. Shipman
ATTORNEY.

Patented July 17, 1928.

1,677,329

UNITED STATES PATENT OFFICE.

PAUL CANTIN, OF EASTBURG, ALBERTA, CANADA.

CULTIVATOR.

Application filed March 11, 1927. Serial No. 174,674.

This invention relates to a cultivator construction with a primary object of providing a means whereby the surface of an entire strip of land will be cut through so as to thoroughly destroy any weeds which might be growing thereon.

The main object is to provide a means for destroying weeds and at the same time loosen the top surface of the ground and leave it in an even bed without undesirable ridges as commonly found after cultivating by the common type of cultivators provided with spaced individual spring-toothed members.

With the foregoing and other objects in view, as will appear as the description proceeds, the invention consists in the novel construction, combination and arrangement of co-operating elements as hereinafter more specifically set forth, claimed and shown in the accompanying drawings forming a part of the present application, in which:

Fig. 1 is a front elevation showing the preferred embodiment of my invention in position relative to a frame of an ordinary farm cultivator.

Fig. 2 is a sectional view taken on the line 2—2 of Fig. 1.

Fig. 3 is a transverse sectional view of a modified form.

Like numerals of reference designate corresponding parts throughout the different views.

I do not wish to limit myself in any manner to the frame work to which this cultivator construction may be mounted as my invention is on the cultivator itself and not on the means of mounting.

With the many different types of frames now on the market, I feel assured that my cultivator construction can be easy adapted for mounting thereon and operated to be raised and lowered as desired, without any great material change being necessary.

With the present type of cultivator, spaced spring-toothed feet are provided each of which form an individual cultivator in itself. When these individual cultivators are drawn through the ground, there is always certain spaces across the width of the cultivator that are not fully covered by the teeth even though the teeth may be staggered. With staggered individual cultivator teeth, the weeds will bend around and a great many of them are missed while cultivating.

In my cultivator, I eliminate the individual cultivators from the ends of the legs. I use only a small number of legs 3, preferably three, in spaced relationship one at each end and two near the centre. Extending across the lower end of these legs and secured thereto, I provide cultivator blades 4, the lower edges of which are sharpened to provide a cutting edge. The inner ends of these blades overlap each other. In making up the cultivator, one, two, three or more of these pairs of cultivator blades 4 may be used in parallel relationship to each other or each successive pairs of blades may be positioned to cut slightly lower than the preceding blades and in this way the cutting pressure will be more equalized between the blades than if the front blades had to cut the full depth.

The foregoing specification and annexed drawings disclose the preferred embodiment of my invention, but it is to be understood that minor changes may be resorted to in the commercial adaptation of my invention without departing from the scope of the invention as hereinbefore claimed.

What I claim as new is:

A cultivator provided with a frame; sets of curved legs extending downwardly from a common support carried from said frame; the lower ends of the legs of each set being in transverse alignment; cutting blades attached to said lower ends of the legs of each set and the length and curvature of the legs of each succeeding set being greater than the preceding set.

In testimony whereof, I affix my signature.

PAUL CANTIN.